N. G. WEBBER.
Cultivator.
No. 102,993.
Patented May 10, 1870.
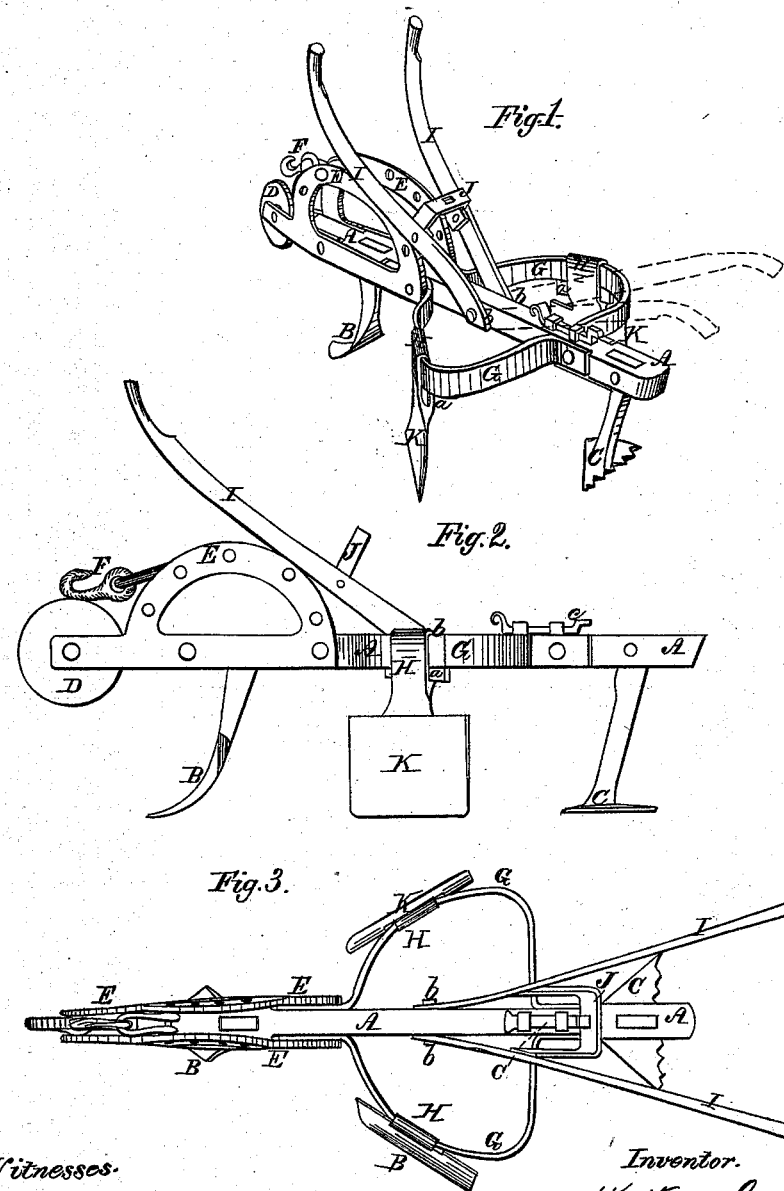

UNITED STATES PATENT OFFICE.

NATHAN G. WEBBER, OF EAST SPRINGFIELD, PENNSYLVANIA.

IMPROVEMENT IN CULTIVATORS.

Specification forming part of Letters Patent No. 102,993, dated May 10, 1870.

*To all whom it may concern:*

Be it known that I, NATHAN G. WEBBER, of East Springfield, in the county of Erie and State of Pennsylvania, have invented a new and useful Improvement in Cultivators; and I do hereby declare the following to be a full, clear, and exact description thereof, reference being had to the accompanying drawings of the same, which make part of this specification, and in which—

Figure 1 represents a view, in perspective, of a cultivator embracing my improvements. Fig. 2 represents a side elevation, showing the handles of the cultivator turned up and folded over and upon the beam. Fig. 3 represents a plan of the same.

My invention consists in constructing the beam of the cultivator with a metallic fixed bow, upon which the shovels are secured in such manner that they may be adjusted nearer to or farther from each other in a curved line, and secured by wedges, in whatever position they may be adjusted, without the necessity of mounting them upon hinged frames or arms, whereby I obtain a more durable and cheaper cultivator than heretofore constructed; also, in hinging and supporting the handles upon the beam in such manner that they may be folded up over the beam when not required for use, or when being shipped or stored away, thus rendering the cultivator more compact for the purposes stated.

In the accompanying drawings, A represents the beam, to the front and rear ends of which the plow-teeth B C are secured in any suitable manner, and of any suitable construction.

To the front end of the beam a roller, D, is attached, for preventing the front furrow plow from penetrating too deeply, and in the rear thereof two semicircular plates, E, are secured, having a series of holes, into any one of which the clevis F is adjusted for regulating the depth of the cultivator shovels.

Near the middle of the length of the beam I secure a metallic bow, G, the sides of which are curved outward and are fixed, and upon the curved sides of which the cultivator-shovels K are arranged, and secured by means of iron shanks H, having loops in their upper ends, which embrace the curved sides of the fixed bow G, so that they may be moved toward and from each other and the beam, according to the width of the rows of plants being cultivated, and secured firmly by wedges *a* inserted into the loop in the shanks H, above or beneath and against the curved arms of the bow G, so as to hold them when adjusted. This arrangement of the fixed bow enables me to adjust the shovels directly, instead of the frame which carries them, and is therefore more convenient and durable as a fixed instead of a hinged frame. By this arrangement the angles which the shovels maintain to each other and to the beam can be more easily adjusted and held in position.

The shovels are made removable, so that they can be replaced by others of different shape and size, when desirable, without removing their shanks from the fixed bow.

The handles I are hinged to the beam at *b*, within the bow-frame, and supported by a connecting yoke-shaped brace, J, which rests upon the beam when the cultivator is in use, as shown in Fig. 3, so that it may be managed with as much firmness as if the handles were bolted to the beam in the usual manner, while hinging and supporting them in this manner allow them to be folded up over the beam, as shown in Figs. 1 and 2, rendering the cultivator more compact for transportation and storage, which is a very great advantage over the long fixed projecting handles.

If it should be deemed necessary to make the connection of the handles with the beam fixed while managing and lifting the cultivator to turn it, a bolt, *c*, is secured to the top of the beam, so as to enter an opening in the supporting end of the bracing-yoke J, and thus lock the handles to the beam.

Having thus described my invention, I claim—

The arrangement of the fixed bow G, the adjustable shovels K, the hinged folding handles I, and the locking and bracing yoke J, as herein shown and described, and for the purpose specified.

NATHAN G. WEBBER.

Witnesses:
I. NEWTON MILLER,
W. W. STRICKLAND.